March 15, 1966  D. B. VAN DOLAH ET AL  3,240,026
POULTRY CHILLING
Original Filed June 17, 1958  4 Sheets-Sheet 1
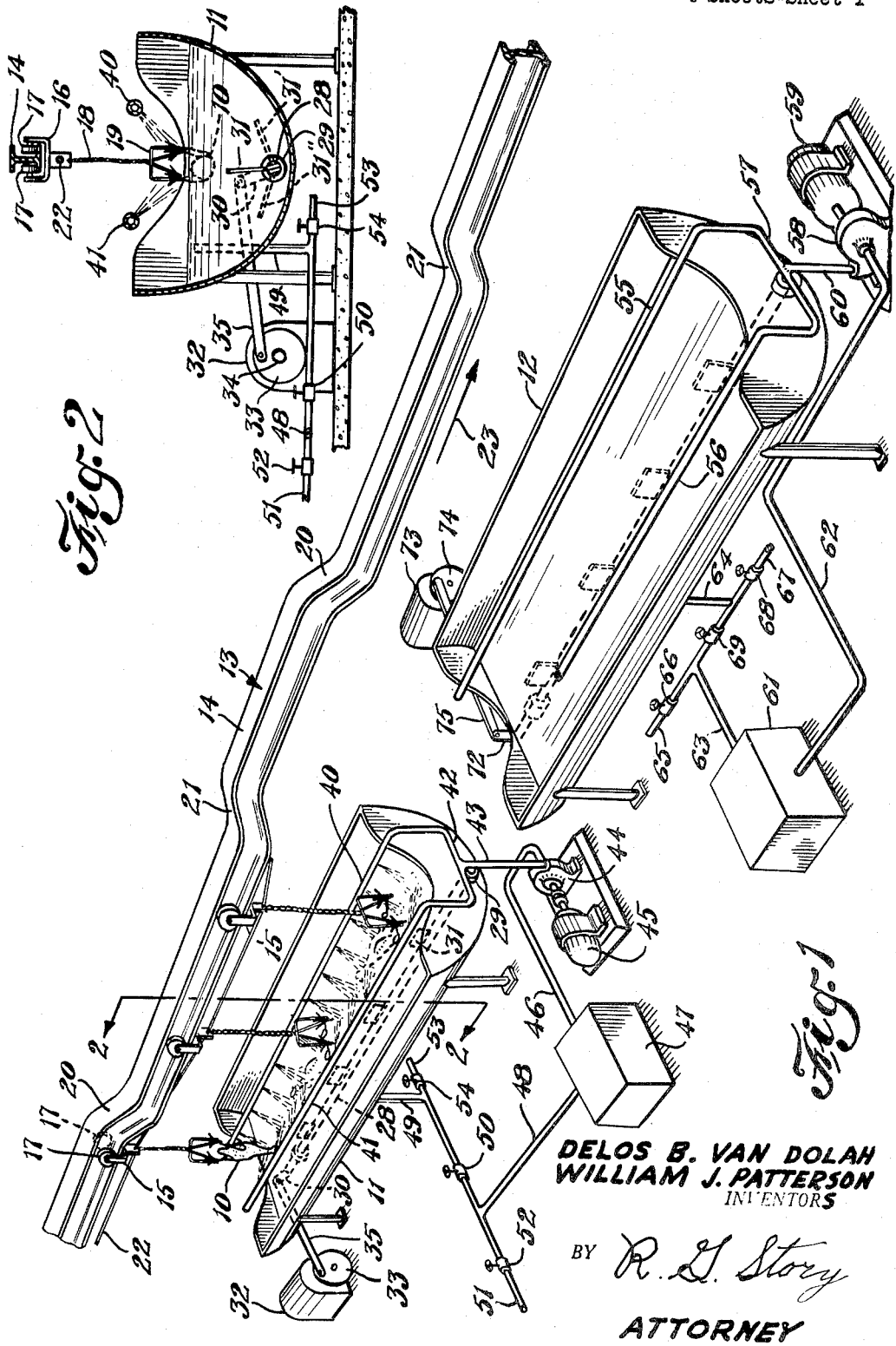
DELOS B. VAN DOLAH
WILLIAM J. PATTERSON
INVENTORS
BY R. G. Story
ATTORNEY

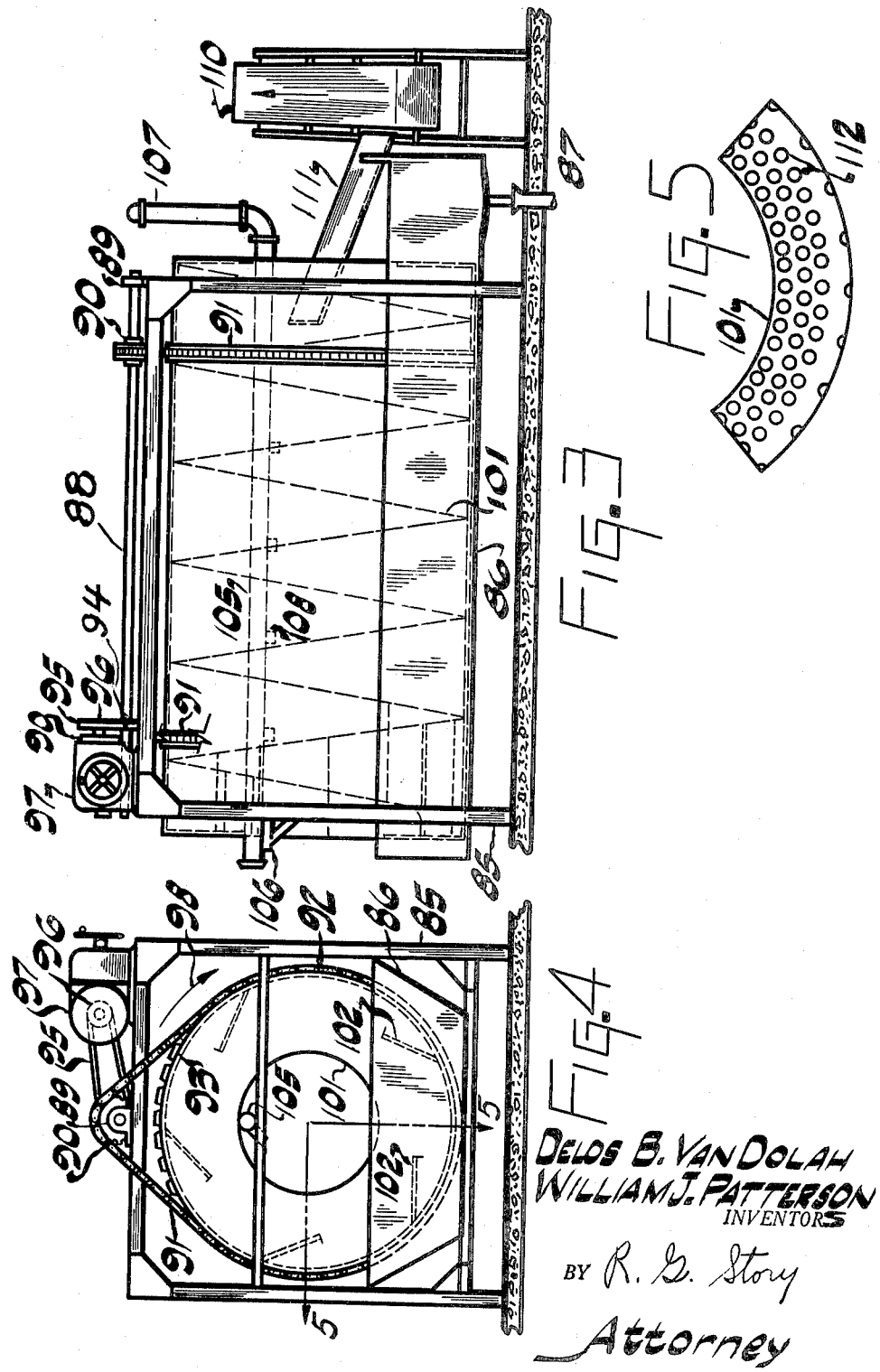

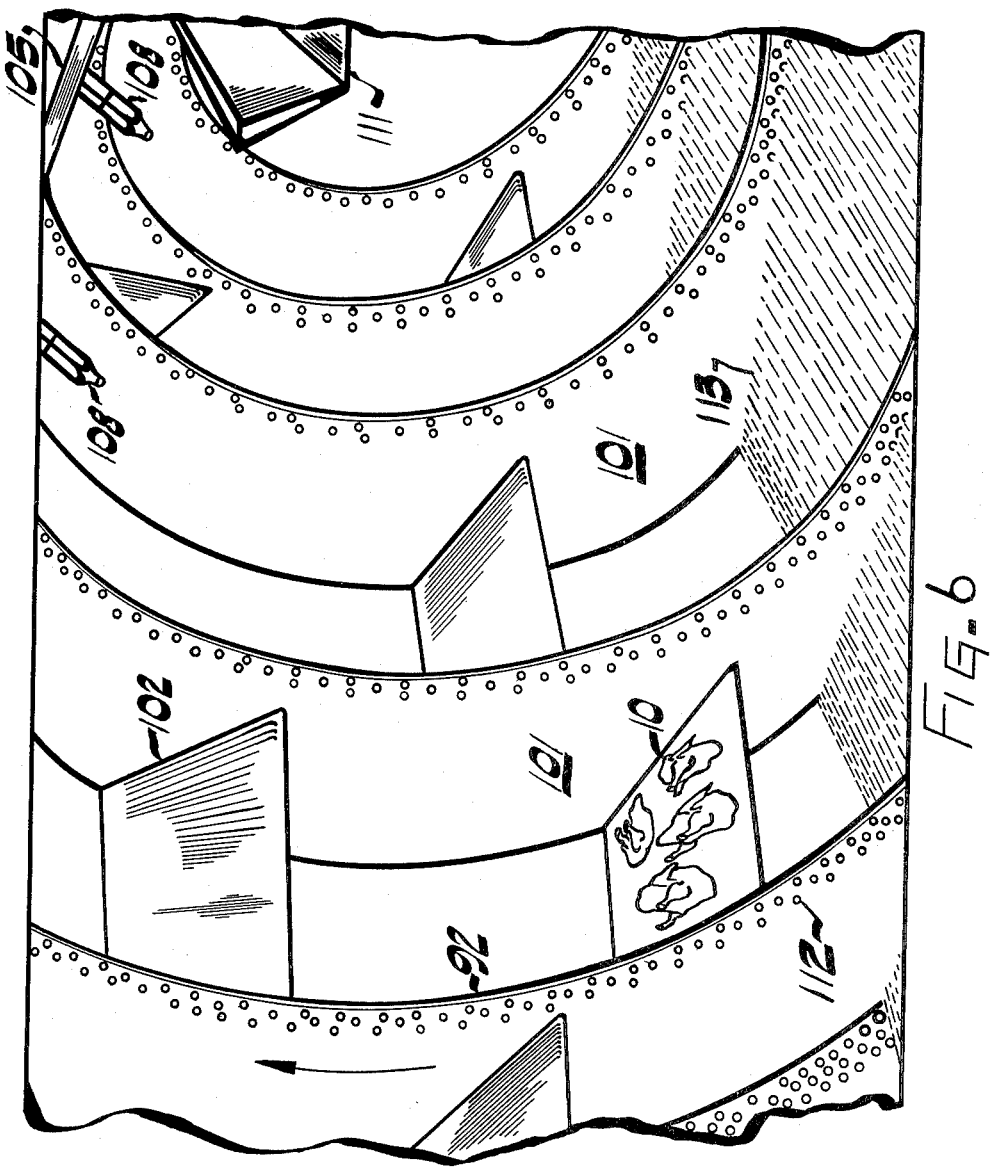

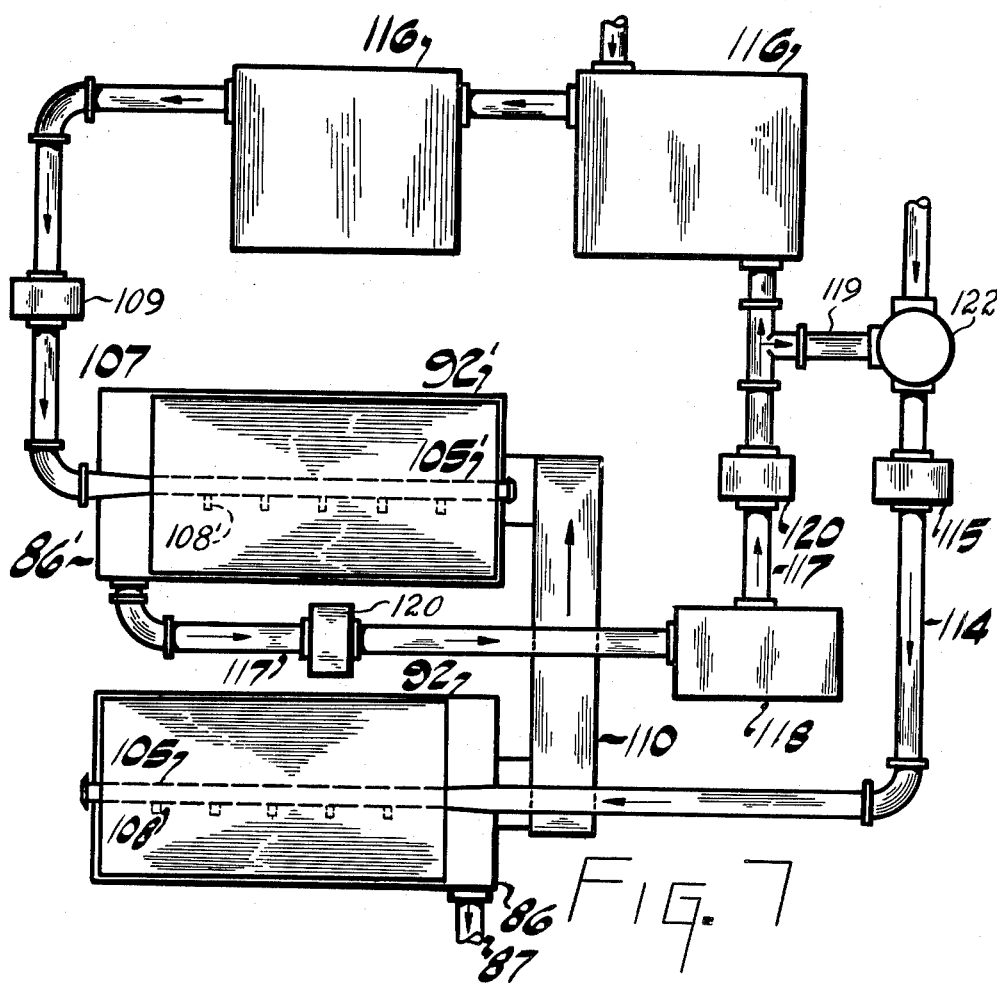

United States Patent Office 3,240,026
Patented Mar. 15, 1966

3,240,026
POULTRY CHILLING
Delos B. Van Dolah, Chicago, and William J. Patterson,
La Grange, Ill., assignors to Swift & Company, Chicago,
Ill., a corporation of Illinois
Continuation of application Ser. No. 742,605, June 17,
1958. This application May 13, 1963, Ser. No. 281,380
The portion of the term of the patent subsequent to
June 28, 1977, has been disclaimed
4 Claims.  (Cl. 62—63)

The present application relates to a method and apparatus for chilling poultry or other animal carcasses and is a continuation of our copending application Serial No. 742,605, filed June 17, 1958, now abandoned, which in turn is a continuation-in-part of our prior copending application Serial No. 655,840 filed on April 29, 1957, now Patent No. 2,942,429.

In modern poultry operations, broilers, turkeys, etc., are processed before they are shipped to market. Because processing plants are often located many miles from important markets, the carcasses must be carefully handled and chilled if they are to arrive at their retail outlets in acceptable condition.

The custom in the industry today is to chill dressed poultry by holding the carcasses in tanks containing a mixture of ice and water for a period of from about four hours to about twenty-four hours. In many instances, the cooling period is shortened somewhat by bubbling air through the water to agitate the carcasses. Although their sizes vary, most of the tanks are sufficiently large to hold about 600 to 900 pounds of product.

One of the principal objects of the present invention is to provide an improved method which accelerates the reduction in temperature of poultry carcasses. Following the preferred practices of the invention, birds can be chilled from normal body temperature down to about 40° F. in as little as twenty minutes. The exact chilling time, of course, will depend upon the number of birds chilled per hour, the capacity of the chilling means, whether or not the birds are stuffed and/or tucked, and the temperature of the cooling fluid.

Another important advantage in chilling poultry carcasses according to the present method and apparatus is that in a short interval of time one can obtain at least as good a product yield, or weight of product, as can be obtained in a conventional 24-hour batch chilling process.

A further object of the present invention is to provide an improved method of chilling carcasses which is more economical with respect to the amount of water and refrigeration added thereto for chilling the carcasses.

One of the problems encountered in chilling processes is the contamination of the chilling liquid. Inasmuch as it is undesirable to pass a contaminated liquid over carcasses, at least part of the coolant must be constantly changed. Replacing the discarded coolant and rechilling the bath to a suitable temperature naturally results in a refrigeration loss. It is also clear that the more heat that is removed from carcasses by refrigerated water the more costly the process will be. In the preferred embodiment of the present method, however, the amount of refrigeration needed to lower the temperature of the carcasses to a satisfactory point is substantially reduced.

Further objects and advantages of the invention will become apparent from the following description taken in conjunction with the drawings in which:

FIGURE 1 is a perspective view of an embodiment of one chilling apparatus to which the invention may be applied;

FIGURE 2 is a section taken at line 2—2 of FIGURE 1;

FIGURE 3 is a side elevation of an alternative embodiment of the apparatus to carry out the method of the present invention;

FIGURE 4 is an end view of the embodiment of FIGURE 3;

FIGURE 5 is a section of an end plate of the spiral shown in FIGURE 3;

FIGURE 6 is a perspective view of the interior of the drum of FIGURES 3 and 4; and FIGURE 7 is a schematic plan of the preferred water circulation and cooling system for carrying out the present method.

In general, the process of the present invention comprises continuously chilling poultry by moving the carcasses in a longitudinal direction through a body of liquid under agitation. A preferred practice involves subjecting the carcasses to a tumbling action in a rotating drum while moving the carcasses through a fluid contained within the drum. Additional benefits are obtained from the invention by carrying out the chilling process in at least two zones or stages.

In the first zone or stage of a two-stage process, a body of cooling fluid having a temperature well below the body heat of the birds (90° to 95° F.) and not below about 42° to 45° F. is applied to recently dressed and eviscerated carcasses. Fluid may also be run over the carcasses by the use of sprays or the like in order to supplement the action of the bath. The contact between the fluid and the carcass is maintained for a sufficient length of time to obtain a very substantial reduction in the body heat of the carcass. Not only does this initial contact reduce body heat, but it also cleanses the carcasses so that contamination of the second chilling bath is greatly reduced or eliminated.

After removing the carcass from the first bath, it is transferred to a second zone or stage and immersed in a second body of a fluid having a temperature substantially lower than 45° F. Moving contact is again maintained between the fluid and the carcass by the procedure outlined in the foregoing paragraph. The contact with the fluid is maintained for a sufficient period of time to reach the temperature desired for the subsequent handling of the poultry.

While a third, or more, washing and/or cooling step could be employed to reach the final temperature, it will be found in most embodiments that a two-step process is adequate.

The term "carcass" as employed herein is deemed to include portions thereof. By recently dressed and eviscerated carcass, we are referring to one that still retains some of its body heat, and it should be understood that eviscerated carcasses, prior to chilling, will lose some body moisture due to body heat. Also the stated temperature ranges generally pertain to the temperature of fluid when first entering the respective zones or stages; and it is to be understood that the fluid will acquire some heat from the carcasses and will, therefore, increase in temperature, somewhat, within each zone, and will accordingly be withdrawn and replaced with fluid at about said temperatures.

In the preferred two-stage embodiment of the invention, the carcasses are moved in a longitudinal direction through a bath of water within a revolving drum. Additionally, a relatively high pressure spray of the cooling water is directed at the surface of the water in the tank and thus at the carcasses at the surface. The temperature of the water is maintained between about 42° F. and about 60° F., and preferably in the upper portion of this range. If the temperature is substantially above 60° F., there is an insufficient amount of cooling of the carcasses. Temperatures below 42° F. require the expenditure of uneconomical refrigeration and will adversely affect the product yield which should recover some lost moisture. After about 10 to 20 minutes in the first bath the carcasses can be removed and placed in a second bath of water, again with mechanical agitation and sprays at the surface of the water. The water in the second bath is maintained at between about 32° F. (or as low as one can get with fresh water without encountering freezing) and about 35° F. Normally we prefer to work at the lower end of this range to speed the cooling of the carcasses and to lower their temperature as far as possible before removing them from the bath. The carcasses are left in this bath for a period of from about 10 minutes to 30 minutes, or until the birds are in a satisfactory condition for packing and shipment.

Also we prefer in most operations to circulate cooling fluid, such as water, in the two baths as shown by the arrows within the piping described in FIGURE 7. Thus the preferred method of circulating water comprises diverting and mixing a portion of the lower temperature water being recycled through the second drum with fresh water to produce a mixture at the temperature required for the first drum, and circulating the mixture as make up fluid to the first drum. All of the refrigeration requirements of the entire system are supplied to the recirculated water returning to the second stage, along with an amount of fresh make up water replacing the portion diverted to the first drum. Where ice is employed as the refrigerant in direct contact with the recirculated water, the melting portion of the ice goes to supplying at least a part of the latter make up water.

It is apparent from the foregoing description of our process that various types of equipment can be employed to carry out the invention. One type of equipment is illustrated in FIGURES 1 and 2 of the drawings. Here carcasses 10 are moved through baths contained in tanks 11 and 12 by overhead conveyor means generally 13. Conveyor 13 includes an overhead track 14 on which run a plurality of trolleys 15. Each of the trolleys consists of a bracket 16 on which are a pair of wheels 17 riding on track 14. Suspended from bracket 16 by a cable 18 is poultry shackle 19 which is employed to grasp the legs of carcass 10. Because track 14 has a drop 20 and a rise 21, carcass 10 is both lowered into and lifted out of the bath before reaching the end of tank 11. The trolleys are connected by means of cable 22 which is moved by a suitable power means in the direction indicated by arrow 23.

A shaft 28 passes longitudinally through tank 11 and is journaled in bearings 29 attached to the tank. At one end of shaft 28 is a protrusion to which is secured a lever 30. Within the tank and affixed to shaft 28 are a series of paddles or agitators 31. A slow speed motor 32 has a wheel 33 forming a crank affixed to its output shaft 34. Rotatably pinned to wheel 33 is connecting rod 35, which is similarly attached to the lever arm 30. It will be apparent that as wheel 33 rotates lever arm 30, paddles 31 are moved back and forth between side positions 31' and 32".

Above and to each side of the path of movement of carcasses 10 through tank 11 are a pair of pipes 40 and 41, respectively, which have a plurality of small openings forming spray heads directed at the general position of carcasses 10 in the tank. Pipes 40 and 41 are connected by header 42 which in turn connects through pipe 43 to the pressure side of pump 44. Pump 44 is operated by a suitable power source such as motor 45. The intake side of pump 44 connects through pipe 46 to a suitable refrigeration apparatus 47. Pipe or water intake means 48 leads into refrigeration apparatus 47. It is connected to standpipe 49 through valve 50 and to water supply pipe 51 through valve 52. In some embodiments it will be desirable to have standpipe 49 connected to a suitable drainpipe 53 through valve 54.

In a similar manner, tank 12 has a pair of spray pipes 55 and 56 connected by header 57. A pump 58 operated by motor 59 feeds header 57 through pipe 60. Refrigeration apparatus 61 is connected to pump 58 by pipe 62 and through pipe 63 is connected to standpipe 64 and to a suitable source of water supply through pipe 65. Arm 72 is driven by motor 73 through a wheel 74 and connecting rod 75.

In operation, conveyor 13 is moved at a suitable speed for properly chilling the carcasses. The water in tank 11 is maintained at a temperature of between about 42° and 60° F. In some localities the temperature of tap water supplied through pipe 50 may be within this range, although probably above 55° F. In this instance, valves 52 and 54 may be opened, while valve 50 will be closed and refrigeration apparatus 47 will be shut down. This will feed pump 44 with water from pipe 51. Standpipe 49 will act as an overflow to discharge the water from tank 11 through pipe 53 to a drain. Where this is not feasible due to the unavailability of suitable temperature water or where the supply temperature varies, or where the cost of water is unreasonably high, some of the water may be recirculated back through valve 50. Refrigeration apparatus 47 can be operated to bring the temperature of the water down within the desired range. However, for more economical operation from the refrigeration and water supply standpoint most installations require the preferred fluid circulation system and method shown in FIGURE 7.

Under ordinary circumstances, the birds are kept within tank 11 for from about 10 to 25 minutes, and are then allowed to drain briefly before they are immersed in the water in tank 12. This tank will usually be operated with little, if any, makeup water through pipe 65. Substantially all of the water in this tank is recirculated by pump 58 through the tank and refrigeration apparatus 61. Preferably the water is cooled to approximately 32° F. After from 10 to 25 minutes in tank 12 the birds will be adequately chilled and can then be removed for packing and/or shipping.

Our preferred cooler apparatus and circulation system is illustrated in FIGURES 3–7. In FIGURE 3, the apparatus is shown to have a frame generally 85. Supported on the lower part of frame 85 is an open topped pan or tank 86. A pipe 87 forms a drain for pan 86. At the top of frame 85 is a shaft 88, mounted in bearings 89 attached to frame 85. A pair of sprockets 90 are attached to the shaft to carry and drive chains 91. Chains 91 pass about and support cylindrical drum 92. A plurality of teeth 93 are provided on the periphery of drum 92 at the point of contact of chain 91 as an engaging and driving means for the drum. A sheave 94 on shaft 88 is driven by belt 95 from a variable speed pulley 96 on the output shaft of a motor 97. Motor 97 is operated so that drum 92 rotates in the direction indicated by arrow 98 in FIGURE 4.

Within drum 92 and secured to the inner wall thereof is a spiral flight 101. The angle of flight 101 is such that, with the rotation illustrated by arrow 98 in FIGURE 4, the birds move through the machine under the urging of the spiral flight in the direction from left to right in FIGURE 3. Attached to the inner wall of drum 92 between the adjacent portions of spiral flight 101 are a plurality of lifters 102.

Spray pipe 105 crosses through the drum within an opening inside flight 101 and is supported at each end by cross-members 106 forming a part of frame 85. Pipe 105 has a plurality of downwardly directed openings 108 which function as spray nozzles. The liquid to be sprayed is supplied to pipe 105 and nozzles 108 through supply pipe 107.

At the discharge end of drum 92 is an endless belt conveyor 110, which is used to deliver carcasses from chute 111 to another drum in a multiple-tank system.

A segment of a flight of spiral 101 is shown in FIGURE 5. Perforations 112 are included in the flight to maintain a constant water level in the tank and to help control the flow of the birds through the cooling system.

FIGURE 6 is a perspective view of the interior of the drum of FIGURES 3 and 4. Within drum 92 and secured to the inner wall thereof is spiral flight 101. Attached to drum 92 between adjacent portions of spiral flight 101 are a plurality of lifters 102. Perforations 112 of spiral 101 help to control the water level within the drum. Nozzles 108 are connected to liquid supply pipe 105. In operation, drum 92 rotates in the direction illustrated by arrow 98.

Birds 10 are raised above the surface of water 113 by lifters 102 and at that point are subjected to a liquid spray coming from nozzles 108. When the birds reach the end of spiral 101 they are dumped onto chute 111 and from there they pass to conveyor 110. The lifters are so arranged that the birds will slide off or fall back into the water shortly after they have received the spray from nozzles 108.

In carrying out the process previously described, two or more coolers of the type illustrated in FIGURES 3–6 are used in tandem or side by side. A particularly suitable side-by-side arrangement of coolers is pictorially shown in FIGURE 7 wherein two cooling drums 92 and 92′ are utilized, the structure of each corresponding to that shown in FIGURES 3 and 4 and wherein similar parts are identified by the same reference characters and reference characters bearing prime exponents, respectively. Water from a suitable fresh source is pumped to the first chilling zone or stage through inlet pipe 114 by pump 115. Within the first cooler 92 water at the aforementioned temperature is ejected into the drum from pipe 105 and nozzles 108. At the same time, a substantial amount of used water is discharged from drainpipe 87. The water flowing through the first cooler should be maintained at a temperature of between about 42° F. and 60° F. A certain amount of refrigerated water will usually be needed to properly condition the total make up fluid, including the fresh water, to this temperature. Such refrigerated water is supplied as follows. Water for the second cooler 92′ is chilled in vats 116. Chopped ice is an economical refrigerant for the vats. After the water has reached a temperature of between about 32° F. and about 35° F., it is pumped by pump 109 through pipes 107 into pipe 105′ and out nozzles 108′ into the second drum 92′. The chilled water of this drum is recirculated to the vats 116 in a stream through return pipe 117 and filter 118 by pumps 120 as shown by the arrows in FIGURE 7. Because the birds have been both cooled and cleansed in the first tank, the water of the second cooler can be recirculated without any danger of contamination. A portion of the recirculated stream is diverted through a pipe 121 before reaching the vats 116 to be mixed at a valve 122 with the fresh water entering pump 115 and pipe 114. The rate of flow of this portion and the fresh water is controlled by valving to produce a mixture at the specified temperature range.

In a specific embodiment of the invention, drum 92 was constructed 15 feet long and 8 feet in diameter. Flights 101 were positioned with a 30-inch pitch and stood out 24 inches from the inside of drum 92. A standpipe was provided for discharge pipes 87 to maintain a liquid level in pan 86 of about 25 inches above the inner wall of drum 92. Lifters 102 extended from the wall of the drum at an angle of about 45° (from a tangent to the drum) and projected to a point spaced 12 inches from the inner wall of drum 92. The drum was rotated at a speed that caused the birds to move from the left end to the right end of the drum in about 11 minutes. The water within the drum was maintained at about 50–55° F. At the rate of 2,500 stuffed and tucked birds per hour, the temperature of the carcasses dropped from 98° F. to 68° F. during the 11-minute period. The birds were then carried to a second revolving drum by conveyor 110. The water in this drum was maintained at about 32° F. After 21 minutes in the second drum, the temperature of the carcasses had been lowered to about 36° to 40° F. The product yield obtained in the 32-minute chill compared favorably with 24-hour batch chill yields.

The foregoing detailed description of the invention is intended to clarify the purpose of the subject method and apparatus and is not intended to limit applicants to the exact details of construction shown and described. It is obvious that certain modifications of the invention will occur to a person skilled in the art.

We claim:

1. In a method of chilling poultry carcasses by contact with fluid wherein the carcasses are chilled in first and second zones through which the carcasses are passed successively in a generally horizontal direction, the improvement in circulating fluid to the zones which comprises partially cooling and washing the carcasses with water at a higher temperature in a first zone from which the used wash water and impurities are discharged, then contacting the carcasses with water at a lower temperature in a second zone, withdrawing a portion of the lower temperature water from the second zone, mixing said portion with an amount of fresh makeup water, and passing the mixture to the first zone.

2. In a method of chilling poultry carcasses by contact with water wherein the carcasses are passed in a generally horizontal direction through first and second revolving drums containing bodies of water at higher and lower temperatures, the improvement in circulating the water to the drums which comprises contacting the carcasses in the first drum with water at the higher temperature to wash and to cool partially the carcasses, adding fresh tap water to the first drum at a given rate and discharging therefrom used water containing impurities at a greater rate, then contacting the washed and partially cooled carcasses in the second drum with water at the lower temperature to further cool the carcasses in the absence of said impurities, adding fresh lower temperature water to the second drum at a further rate at least equal to the difference between said greater and given rates, withdrawing from the second drum a portion of used water and mixing said portion with said fresh tap water for use in washing and in partially cooling carcasses at the higher temperature in said first drum.

3. In a method of chilling poultry carcasses with water wherein the carcasses are passed through first and second revolving drums containing bodies of water at relatively higher and lower temperatures, respectively, the improvement in circulating the water which comprises circulating water at the higher temperature in the first drum to wash and to partially cool the carcasses, said water at the higher temperature being made up of tap water and a portion of the relatively lower temperature water withdrawn from the second drum, adding such make up water to the first drum and discharging therefrom used water in like amount containing impurities, concurrently circulating lower temperature water in the second drum to further cool said carcasses, continuously recirculating said lower temperature water through said second drum and withdrawing a stream of lower temperature water therefrom and mixing a portion of said stream of water with said tap water for said first drum, the amount of said portion being controlled to produce a mixture of a desired temperature as make up water for said first drum, and recirculating and refrigerating the remainder of said stream to said second drum while adding fresh water thereto in an amount at least equal to said portion.

4. The method of claim 3 wherein the mixture of water circulated to said first drum is within the range of 42° F. to 60° F., and the water circulated to said second drum is within the range of 32° F. to 35° F.

(References on following page)

References Cited by the Examiner

UNITED STATES PATENTS

| | | | |
|---|---|---|---|
| Re. 18,124 | 7/1931 | Reeh | 62—375 |
| 916,290 | 3/1909 | Fleming | 134—94 |
| 1,420,740 | 6/1922 | Peterson | 62—64 |
| 2,274,284 | 2/1942 | Vore | 62—64 |
| 2,426,817 | 9/1947 | Charlton et al. | 62—64 |
| 2,794,326 | 6/1957 | Mencacci | 62—65 X |
| 2,825,927 | 3/1958 | Lafeyre et al. | 17—6 |
| 2,875,594 | 3/1959 | Schilling | 62—303 |
| 2,942,429 | 6/1960 | Van Dolah et al. | 62—64 |

FOREIGN PATENTS

| | | |
|---|---|---|
| 601,692 | 12/1925 | France. |

EDWARD J. MICHAEL, *Primary Examiner.*